UNITED STATES PATENT OFFICE.

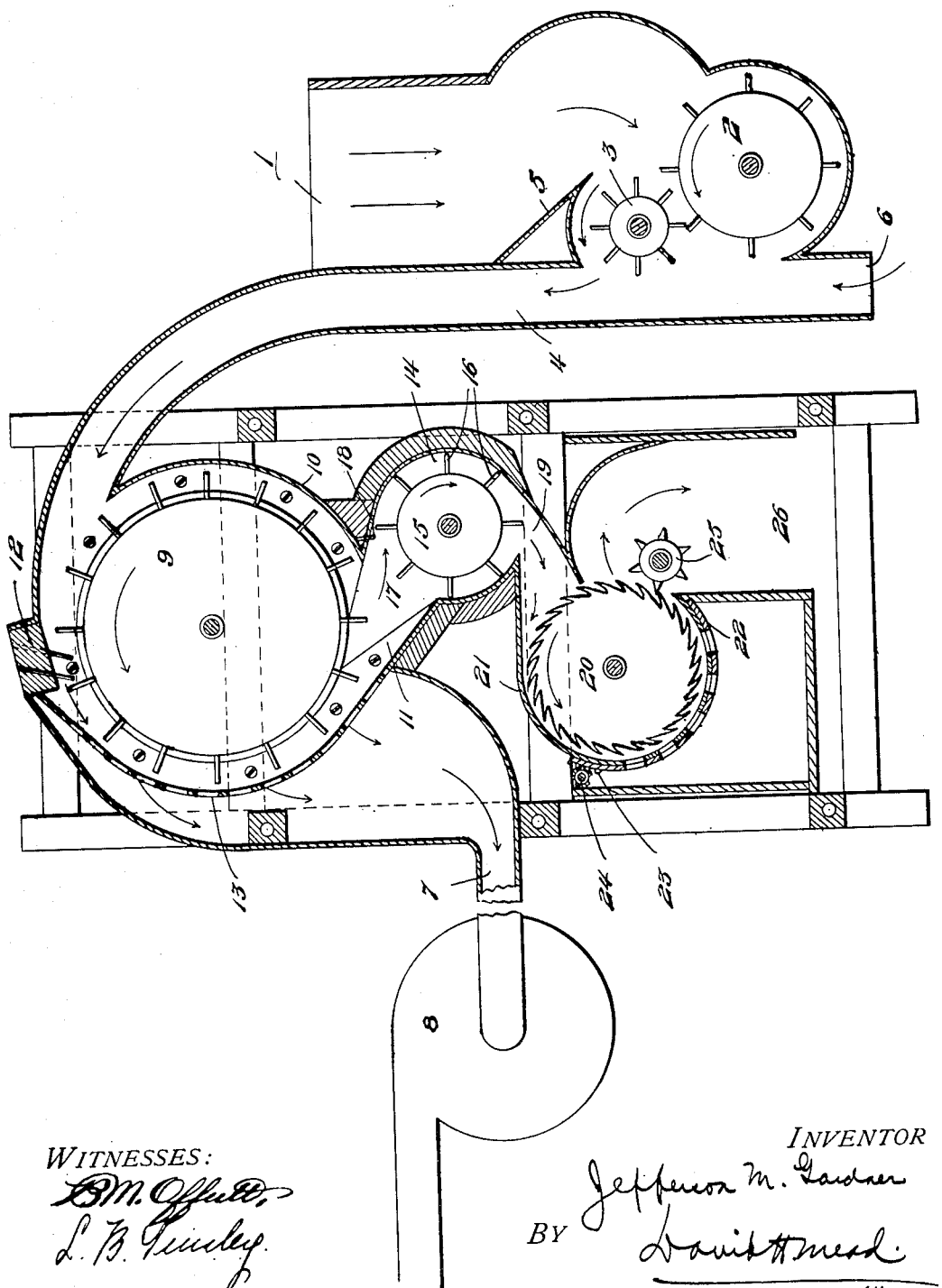

JEFFERSON M. GARDNER, OF NEW LONDON, CONNECTICUT.

COTTON-CLEANING MACHINE.

No. 888,396.

Specification of Letters Patent.

Patented May 19, 1908.

Application filed May 21, 1907. Serial No. 374,896.

*To all whom it may concern:*

Be it known that I, JEFFERSON M. GARDNER, a citizen of the United States, residing at New London, in the county of New London and State of Connecticut, have invented certain new and useful Improvements in Cotton-Cleaning Machines, of which the following is a specification.

This invention relates to cleaning seed cotton preparatory to ginning.

The object of the invention is to provide effective means for freeing cotton from dust, dirt, bolls and other objectionable matter in order to allow cotton to be picked rapidly and with less care in the operation than is usual, thus effecting a great saving in the cost of the labor involved.

With this object in view the invention consists of an apparatus incorporating the general and specific features of construction and arrangement of parts, substantially as hereinafter described and claimed.

The invention is illustrated in the accompanying drawing in which the figure represents a transverse vertical sectional view of the preferred form of apparatus for carrying out the various steps of cleaning.

The seed cotton is fed into an inlet passage 1 in any suitable way, and is subjected to a partial threshing by coming into contact with toothed cylinders 2, and 3 mounted in the lower portion of the inlet and it is by this means projected into an air passage 4. The lower cylinder 2, is rotated in the direction indicated by the arrow and carries cotton falling on it inward to be engaged by the teeth of the smaller rapidly revolving toothed cylinder 3, and by the latter is brought into the passage 4. A shield or guard 5 is arranged above the cylinder 3 and serves to prevent the cotton from coming initially into contact with this cylinder, directing it upon the cylinder 2. The cylinders 2 and 3 coacting as they do serve primarily to feed the cotton uniformly into the air passage but their action also serves to loosen up the cotton and present it in a condition tending to facilitate the other treatment to which it is subjected. The air passage 4 has an open inlet end 6, and extends upward and then downward terminating in a discharge opening 7 to which is attached an exhaust fan 8 by which suction sufficient to convey cotton into the machine and to carry off dust, dirt and other foreign substances freed from the cotton, is created. After being threshed by the toothed cylinders 2 and 3, the seed cotton entering the air passage is loosened and therefore any heavy substances carried by the cotton are disengaged therefrom and will fall, of their own weight, through the lower open end of the air passage free of the machine. The cotton carried upward through the passage 4 is brought into contact with the toothed threshing roller 9, which is rotated in the direction shown by the arrow, and which is inclosed in a casing 10, having an inlet opening in its upper end communicating with the air passage 4 and a discharge opening 11, through which the cotton, after being threshed, falls. Arranged above the cylinder 9 is a toothed bar 12, the projections whereof extend between the teeth of the cylinder 9 so that the cotton carried by the cylinder is loosened up thoroughly liberating dust, dirt, etc., carried by it.

The smaller and lighter portions of the objectionable matter carried by the cotton are removed therefrom immediately after being acted upon by the threshing cylinder 9. To accomplish this the side of the casing 10, adjacent to the discharge 7, is formed by a plate 13, of perforated metal having therein openings of a size to allow the passage therethrough of small particles of dirt etc. and too small to permit the escape through them of the fiber of the cotton. Light foreign substances are drawn through the openings in the plate 13, and are carried off by the draft created by the suction fan and are discharged through the eye of the latter. The cotton, after being threshed and relieved from small and light foreign substances, falls into a cylindrical casing 14, in which is located a rotating drum 15, having projecting from it bars 16, of a width and length to just clear the inner surface of the casing. The casing has extending across it in its upper portion and in a position to receive the cotton carried downward by the cylinder 9, an inlet passage 17, and in the upper portion of the passage are placed pins 18, which serve to free cotton which may adhere to the projections 16 of the drum 15.

A discharge passage 19 extends downward from the casing 14, and the cotton carried by the toothed drum is directed through this passage to the surface of a cylinder 20, composed of spikes or saws. The cylinder 20 is inclosed in a casing 21, the lower portion of which is formed with openings which are adjustable in size.

I preferably form the part of the casing having the openings therein of two metal plates having registering openings therethrough. The inner plate 21 is stationary while the outer one 22 is capable of sliding in order to increase or diminish the size of the registering openings. As a convenient means of moving the plate 22 I attach to it a rack 23 with which meshes a pinion 24 so that by rotating the latter the plate may be shifted in the desired direction.

The toothed cylinder 20 is rotated at high speed in the direction indicated and any bolls or heavy matter carried by the cotton which has been loosened up by the operations previously described are thrown by centrifugal force through the openings in the casing surrounding the cylinder.

The seed cotton, after being carried beyond the openings in the casing, is removed from the teeth of the cylinder 20 by the doffing roller 25 and discharged through the outlet 26.

Having thus described my invention, what I claim as new, and desire to secure by Letters Patent, is:—

1. A cotton cleaning machine comprising a feed opening, means for threshing cotton arranged in the feed opening, and an air passage adjacent to and communicating with the feed opening, and having a lower open end, substantially as described.

2. A cotton cleaning machine comprising a feed opening, means for threshing cotton arranged in the feed opening, an air passage adjacent to and communicating with the feed opening, and having a lower open end, a casing having a portion thereof formed with perforations interposed in the air passage, and means arranged in the casing for threshing cotton, substantially as described.

3. A cotton cleaning machine comprising a feed opening, two threshing cylinders arranged in the feed opening, a shield or guard arranged above the cylinders, an air passage adjacent to and communicating with the feed opening, and having an open end, a casing having a portion thereof formed with perforations interposed in the air passage, and means arranged in the casing for threshing cotton, substantially as described.

4. A cotton cleaning machine comprising a feed opening, a threshing cylinder arranged in the feed opening, a second rapidly revolving threshing cylinder arranged adjacent to and adapted to co-act with the first, an air passage adjacent to and communicating with the feed opening, and having an open end, a casing having a portion thereof formed with perforations interposed in the air passage, and means arranged in the feed opening for threshing cotton, substantially as described.

5. A cotton cleaning machine comprising an air passage connected with an exhaust fan, a casing having a portion thereof provided with perforations interposed in the air passage, means for threshing cotton arranged in the casing, a second casing having openings therein arranged below the first, means for regulating the openings in the second casing, a toothed cylinder arranged in the second casing, and means for conveying cotton from the first to the second casing, substantially as described.

6. A cotton cleaning machine comprising an air passage, a casing having a portion thereof provided with perforations interposed in the air passage, means for threshing cotton arranged in the casing, a second casing having a toothed cylinder mounted therein and having a portion thereof formed of plates having registering openings, one plate being movable to allow changing the size of the openings, and means for conveying cotton from the first to the second casing, substantially as described.

7. A cotton gin comprising a feed opening, means for threshing cotton arranged in the feed opening, an air passage adjacent to and communicating with the feed opening, and having a lower open end, a casing having a portion thereof provided with perforations interposed in the air passage, means for threshing cotton arranged in the casing, and a second casing having openings therein, a toothed cylinder arranged in the second casing, and means for conveying cotton from the first to the second casing, substantially as described.

8. A cotton cleaning machine comprising an air passage, a casing having a portion thereof provided with perforations interposed in the air passage, means for threshing cotton arranged in the casing, and a second casing having openings therein, a toothed cylinder arranged in the second casing, and means for conveying cotton from the first to the second casing, substantially as described.

In testimony whereof I affix my signature in presence of two witnesses.

JEFFERSON M. GARDNER.

Witnesses:
EDWARD T. BROADY,
GEORGE T. BROWN.